US012508895B2

(12) United States Patent
Gilge et al.

(10) Patent No.: US 12,508,895 B2
(45) Date of Patent: Dec. 30, 2025

(54) OFF-ROAD VEHICLE HAVING AN AFTWARDLY PIVOTABLE RADIATOR

(71) Applicant: Arctic Cat Inc., Thief River Falls, MN (US)

(72) Inventors: Brent Thomas Gilge, Thief River Falls, MN (US); Christopher J. Evans, Thief River Falls, MN (US); Charles Simenson, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 335 days.

(21) Appl. No.: 18/144,064

(22) Filed: May 5, 2023

(65) Prior Publication Data

US 2024/0367504 A1    Nov. 7, 2024

(51) Int. Cl.
*B60K 11/04* (2006.01)

(52) U.S. Cl.
CPC .................................... *B60K 11/04* (2013.01)

(58) Field of Classification Search
CPC ...... B60K 11/04; B60Y 2200/124; F01P 3/18; F01P 2070/52; F01P 1/06; F01P 3/12
See application file for complete search history.

(56) References Cited

U.S. PATENT DOCUMENTS

| 3,834,478 | A | * | 9/1974 | Alexander | B60K 11/04 165/77 |
| 4,541,645 | A | * | 9/1985 | Foeldesi | B60K 11/04 180/232 |
| 6,994,388 | B2 | * | 2/2006 | Saito | B60N 2/36 296/65.09 |
| 7,370,690 | B2 | * | 5/2008 | Rasset | F28D 1/0435 165/41 |
| 7,398,847 | B2 | * | 7/2008 | Schmitt | B60K 11/04 248/232 |

(Continued)

FOREIGN PATENT DOCUMENTS

| DE | 3010485 C2 | 3/1987 | |
| EP | 2112012 A1 * | 10/2009 | ............. B60K 11/04 |

(Continued)

OTHER PUBLICATIONS

GB-2332507-A English Translation (Year: 1999).*

(Continued)

*Primary Examiner* — Michael T. Walsh
(74) *Attorney, Agent, or Firm* — Lawrence Youst PLLC

(57) ABSTRACT

An off-road vehicle includes a frame assembly, a powertrain coupled to the frame assembly and a plurality of wheels at least one of which is operatively coupled to the powertrain. A seating assembly is coupled to the frame assembly and a cargo box is coupled to the frame assembly aft of the seating assembly. A radiator is hingedly coupled to the frame assembly aft of the seating assembly and is configured to pivot aftwardly from an operating configuration to an access configuration. In the operating configuration, the radiator has a forward tilted orientation in which a top of the radiator is positioned forward of a bottom of the radiator. In the access configuration, the radiator has a substantially vertical orientation or an aftward tilted orientation in which the top of the radiator is positioned aftward of the bottom of the radiator.

20 Claims, 12 Drawing Sheets

(56) References Cited

U.S. PATENT DOCUMENTS

| | | |
|---|---|---|
| 7,401,672 B2 | 7/2008 | Kurtz, Jr. et al. |
| 7,815,002 B2 | 10/2010 | Etou |
| 8,141,670 B2 | 3/2012 | Hayashi et al. |
| 10,189,428 B1 | 1/2019 | Sellars et al. |
| 10,239,571 B2 * | 3/2019 | Kennedy .................. B60K 5/04 |
| 10,518,630 B2 * | 12/2019 | Uno .......................... F01P 3/18 |
| 2006/0213639 A1 | 9/2006 | Kobayashi et al. |
| 2018/0065465 A1 | 3/2018 | Ward et al. |

FOREIGN PATENT DOCUMENTS

| | | | | |
|---|---|---|---|---|
| FR | 2478551 A1 * | 9/1981 | ................ | F01P 7/10 |
| GB | 2332507 A * | 6/1999 | ................ | F01P 3/18 |
| JP | H0932553 A * | 2/1997 | | |
| KR | 102414742 B1 * | 6/2022 | ............. | B60K 11/04 |

OTHER PUBLICATIONS

FR-2478551-A1 English Translation (Year: 1981).*
JP-H0932553-A English Translation (Year: 1997).*
KR-102414742-B1 English Translation (Year: 2022).*
EP-2112012-A1 English Translation (Year: 2009).*
Speed UTV Design Presentation Mar. 27, 2020.
Speed UTV Design Presentation Jun. 10, 2020.
Speed UTV Design Presentation Sep. 2, 2021.

* cited by examiner

OFF-ROAD VEHICLE HAVING AN AFTWARDLY PIVOTABLE RADIATOR

TECHNICAL FIELD OF THE DISCLOSURE

The present disclosure relates, in general, to off-road vehicles having an engine cooling system and, in particular, to off-road vehicles having a radiator that is positioned aft of the seating assembly at a forward end of the cargo bed and that is aftwardly pivotable from a forward tilted operating configuration to a substantially vertical or aftward tilted access configuration.

BACKGROUND

Off-road vehicles are popular land vehicles used to transport persons, cargo and accessories. Such off-road vehicles include all-terrain vehicles (ATV), light utility vehicles (LUV), side-by-side vehicles (SxS), utility-terrain vehicles (UTV), recreational off-highway vehicles (ROV) and multipurpose off-highway utility vehicles (MOHUV), to name a few. Certain off-road vehicles are primarily designed for utility applications and may offer high ground clearance, low gear ratios for towing, racks for hauling large loads, large dump boxes and/or high payload capacity. Other off-road vehicles are primarily designed for recreational applications and may offer high performance engines as well as safety features including rollover protection, hard tops, windshields and/or cab enclosure features such as body panels that restrict occupant egress in the event of a rollover. While some off-road vehicles have handlebar steering and motorcycle-style seating, many off-road vehicles utilize automobile-style controls such as a steering wheel and foot pedals, and have side-by-side seating for the occupants. Off-road vehicles commonly have front and/or rear suspensions including shock absorbers that damp vibrations and reduce the rocking and swaying experience by the occupants making such off-road vehicles suitable for travel over a diversity of terrains, in various conditions and at an array of speeds.

Many off-road vehicles that are powered by an internal combustion engine utilize an engine cooling system that includes a radiator to dissipate heat generated by the engine. Such radiators are typically located toward the front of the vehicle. To maintain a center of mass of the vehicle that is biased somewhat rearwardly, it may be desirable to position the radiator behind the longitudinal center of the vehicle, such as behind the seating assembly at the forward end of the cargo bed. It has been found, however, that access to vehicle components located below such an aftward mounted radiator requires removal of the radiator. In addition, it has been found, that cleaning the front side of such an aftward mounted radiator also requires removal of the radiator. Accordingly, a need has arisen for an improved engine cooling system that employs an aftward mounted radiator that does not require removal of the radiator for access to vehicle components located below the radiator or for cleaning the front side of the radiator.

SUMMARY

In a first aspect, the present disclosure is directed to an off-road vehicle including a frame assembly, a powertrain coupled to the frame assembly and a plurality of wheels with at least one of the wheels operatively coupled to the powertrain. A seating assembly is coupled to the frame assembly and a cargo box coupled to the frame assembly aft of the seating assembly. A radiator is hingedly coupled to the frame assembly aft of the seating assembly and is configured to pivot aftwardly from an operating configuration to an access configuration. In the operating configuration, the radiator has a forward tilted orientation in which a top of the radiator is positioned forward of a bottom of the radiator. In the access configuration, the radiator has a substantially vertical orientation or an aftward tilted orientation in which the top of the radiator is positioned aftward of the bottom of the radiator.

In certain embodiments, the powertrain may include an engine and the radiator may be fluidically coupled to the engine such that heated fluid from the engine circulates through the radiator to be cooled. In some embodiments, the radiator may be positioned above the engine such that in the operating configuration, the engine is non-accessible from above and in the access configuration, the engine is accessible from above. In certain embodiments, the radiator may be positioned at a forward end of the cargo box. In some embodiments, a hinge assembly may be coupled between the frame assembly and the radiator. In such embodiments, the hinge assembly may include first and second hinge members, the hinge assembly may be coupled to the bottom of the radiator and/or the hinge assembly may define a laterally extending axis of rotation for the radiator located proximate the bottom of the radiator. In certain embodiments, a lock assembly may selectively secure the radiator to the frame assembly in the operating configuration. For example, the lock assembly may selectively secure the top of the radiator to the frame assembly in the operating configuration. In such embodiments, the lock assembly may include a first bracket having a pair of slots, a pair of projections coupled to the top of the radiator and a second bracket having a pair of openings wherein, the first bracket may be coupled to the frame assembly, each projection may be received within a corresponding one of the slots when the radiator is in the operating configuration and each projection may be received within a corresponding one of the openings when the second bracket is coupled to the first bracket to secure the radiator in the operating configuration.

In certain embodiments, in the operating configuration, the forward tilted orientation of the radiator may be between thirty degrees and sixty degrees from vertical, may be between forty degrees and fifty degrees from vertical or may be about forty-five degrees from vertical. In some embodiments, in the access configuration, the aftward tilted orientation of the radiator may be between zero degrees and forty degrees from vertical, may be between ten degrees and thirty degrees from vertical or may be about twenty degrees from vertical. In certain embodiments, a shroud may be positioned within the cargo box aft of the radiator such that the shroud is configured to separate a storage area of the cargo box from the radiator. In some embodiments, the off-road vehicle may be a side-by-side vehicle.

In a second aspect, the present disclosure is directed to an off-road vehicle including a frame assembly, a powertrain including an engine and a plurality of wheels with at least one of the wheels operatively coupled to the powertrain. A seating assembly is coupled to the frame assembly and a cargo box coupled to the frame assembly aft of the seating assembly. A radiator is fluidically coupled to the engine such that heated fluid from the engine circulates through the radiator to be cooled. The radiator is positioned above the engine, aft of the seating assembly and at a forward end of the cargo box. The radiator is configured to pivot aftwardly from an operating configuration to an access configuration. A hinge assembly is coupled between the frame assembly and a bottom of the radiator. The hinge assembly defines a laterally extending axis of rotation about which the radiator pivots between the operating configuration and the access configuration. A lock assembly is configured to selectively secure a top of the radiator to the frame assembly in the operating configuration. In the operating configuration, the radiator has a forward tilted orientation in which the top of the radiator is positioned forward of the bottom of the radiator. In the access configuration, the radiator has a substantially vertical orientation or an aftward tilted orientation in which the top of the radiator is positioned aftward of the bottom of the radiator.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
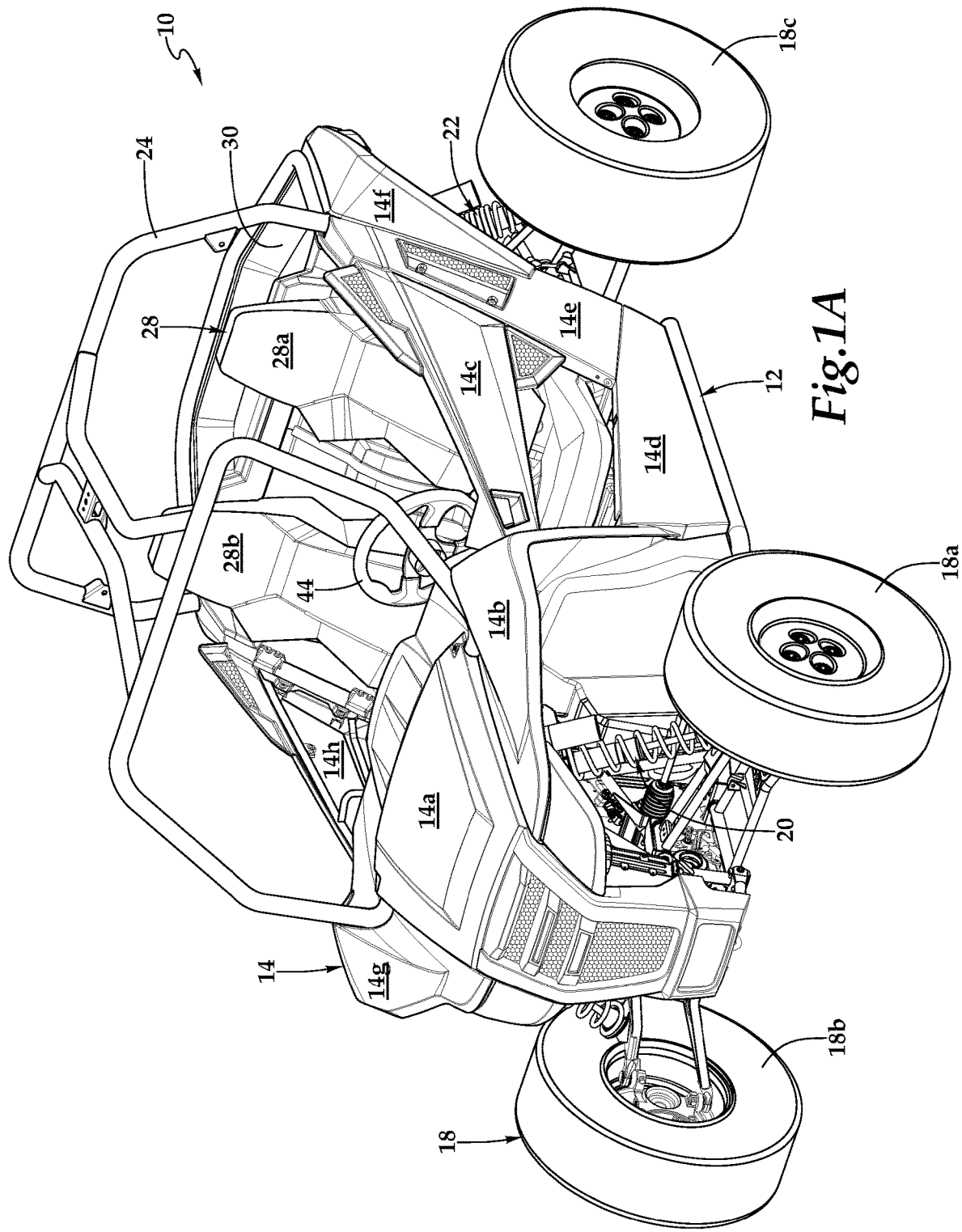
FIGS. 1A-1D are schematic illustrations of an off-road vehicle having an aftwardly pivotable radiator in accordance with embodiments of the present disclosure.
Figure 1B:
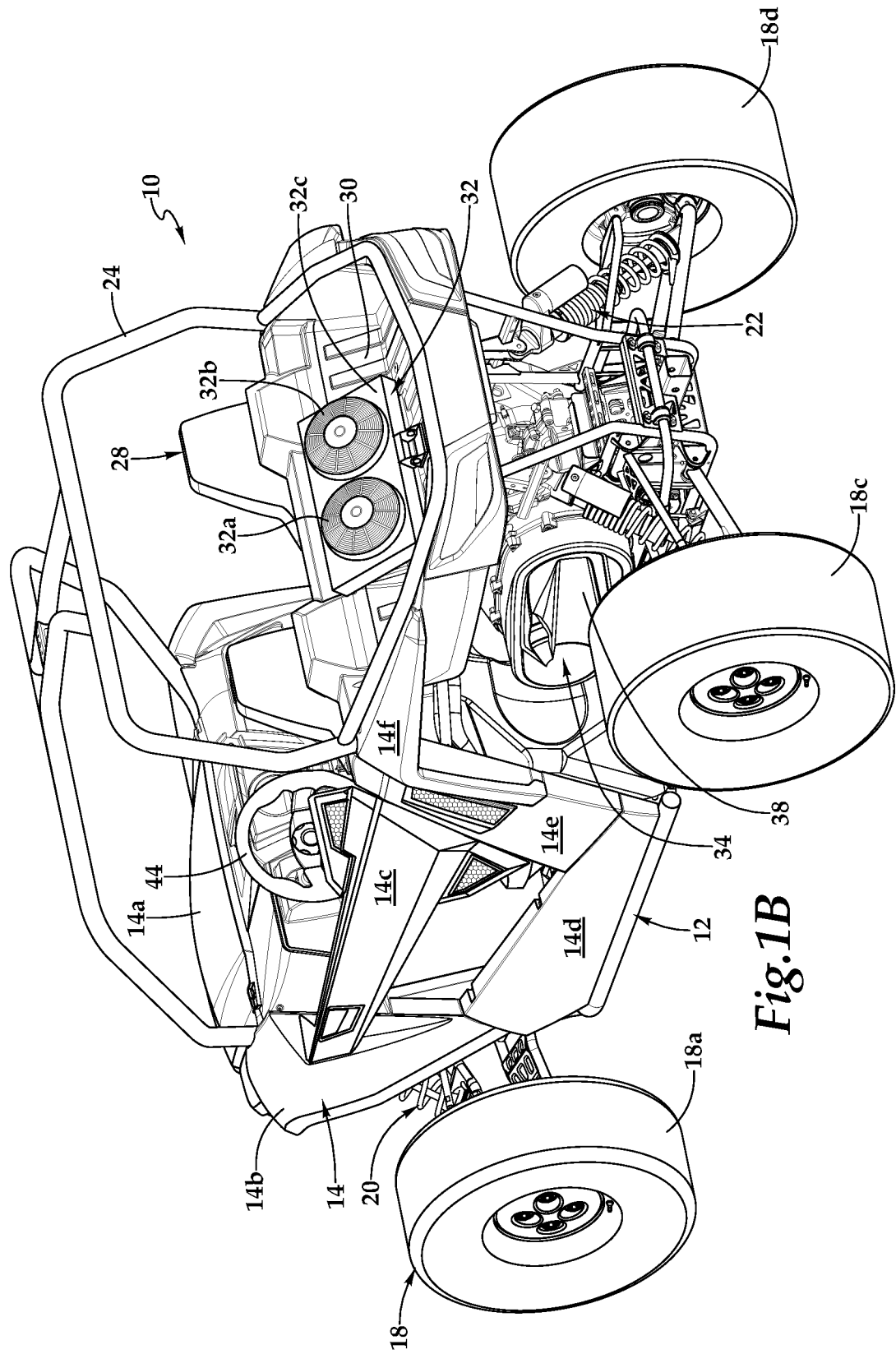
Figure 1C:
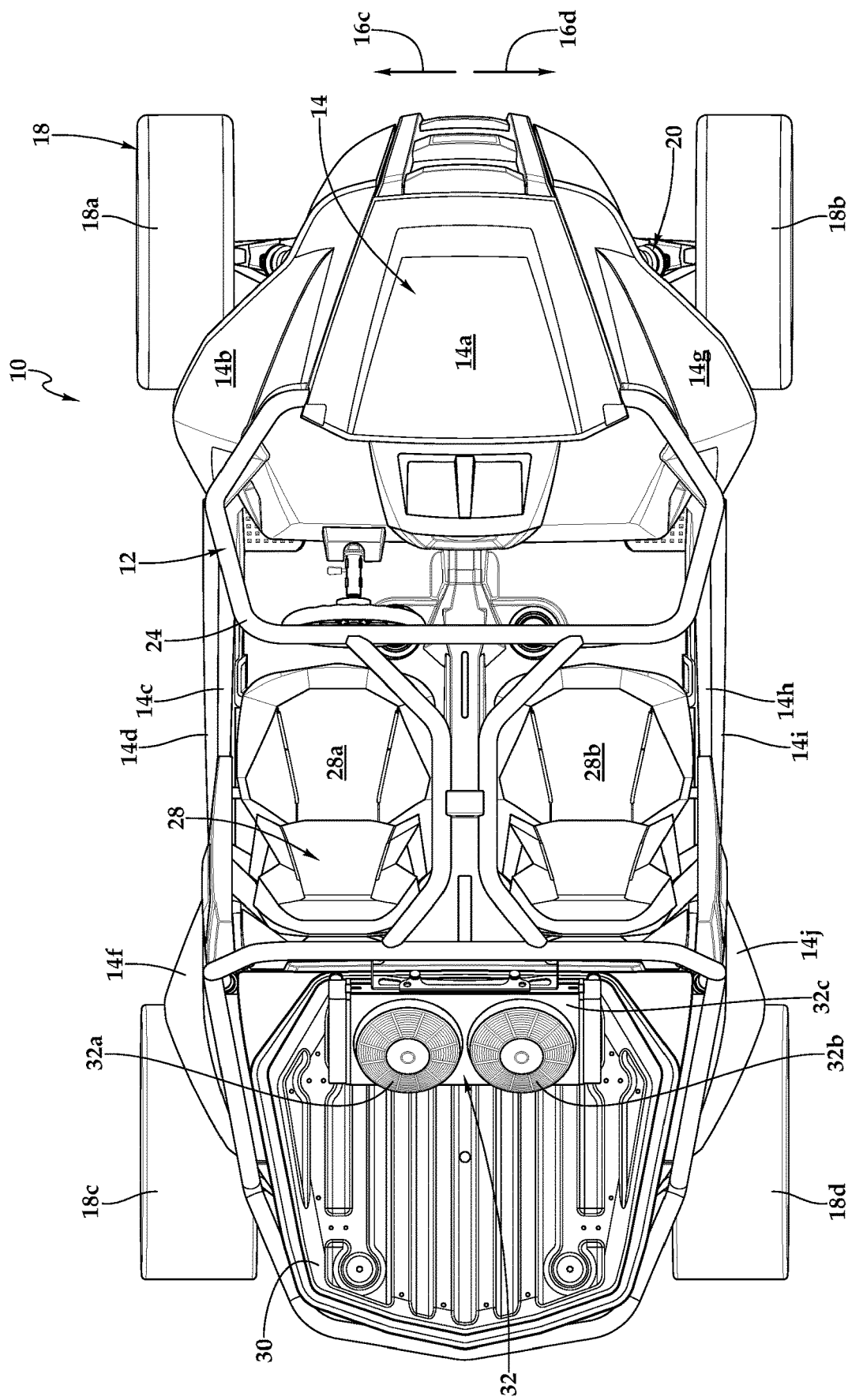

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1D in the drawings, a land vehicle depicted as an off-road vehicle having an aftwardly pivotable radiator is schematically illustrated and generally designated 10. In the illustrated embodiment, off-road vehicle 10 is a side-by-side vehicle. In other embodiments, off-road vehicle 10 may be an all-terrain vehicle, a light utility vehicle, a utility-terrain vehicle, a recreational off-highway vehicle, a multipurpose off-highway utility vehicle or the like. Structural support for off-road vehicle 10 is provided by frame assembly 12, on or around which the various components of off-road vehicle 10 are assembled. Frame assembly 12 is formed of a plurality of structural members that are interconnected by welds, bolts, pins, adhesive and/or other suitable fastening means. Some of the structural members may be tubular members including round or square tubular members that may be hollow and may be formed from metal or metal alloy, such as steel or aluminum. Alternatively or additionally, certain structural members may be formed from polymeric materials such as a fiber reinforced polymer composite.

Off-road vehicle 10 includes a plurality of body panels that cover and protect certain components of off-road vehicle 10 such as hood panel 14a, left front fender panel 14b, left door panel 14c, left lower panel 14d, left rear panel 14e and left rear fender panel 14f. It should be understood by those having ordinary skill in the art that off-road vehicle 10 has similar body panels on the right side of the vehicle including right front fender panel 14g, right door panel 14h, right lower panel 14i and right rear fender panel 14j with the body panels of off-road vehicle 10 being collectively referred to herein as body panels 14. Body panels 14 may be formed from sheet metal or metal alloy, such as steel or aluminum, and/or polymeric materials such as fiber reinforced polymer composites. In addition, it should be understood by those having ordinary skill in the art that the right side and the left side of off-road vehicle 10 will be with reference to a forward-facing occupant of off-road vehicle 10 with the right side of off-road vehicle 10 corresponding to the right side of the occupant and the left side of off-road vehicle 10 corresponding to the left side of the occupant. The forward direction of off-road vehicle 10 is indicated by forward arrow 16a and the backward direction of off-road vehicle 10 is indicated by backwards arrow 16b, in FIG. 1D. The forward and backward directions also represent the longitudinal direction of off-road vehicle 10 with the lateral direction of off-road vehicle 10 being normal thereto and represented by a leftward arrow 16c and a rightward arrow 16d, in FIG. 1C. The backward direction may also be referred to herein as the aftward direction.

Off-road vehicle 10 includes a plurality of ground engaging members depicted as four wheels 18 including front wheels 18a, 18b that are coupled to frame assembly 12 by a front suspension 20 and rear wheels 18c, 18d that are coupled to frame assembly 12 by a rear suspension 22.

Figure 1D:
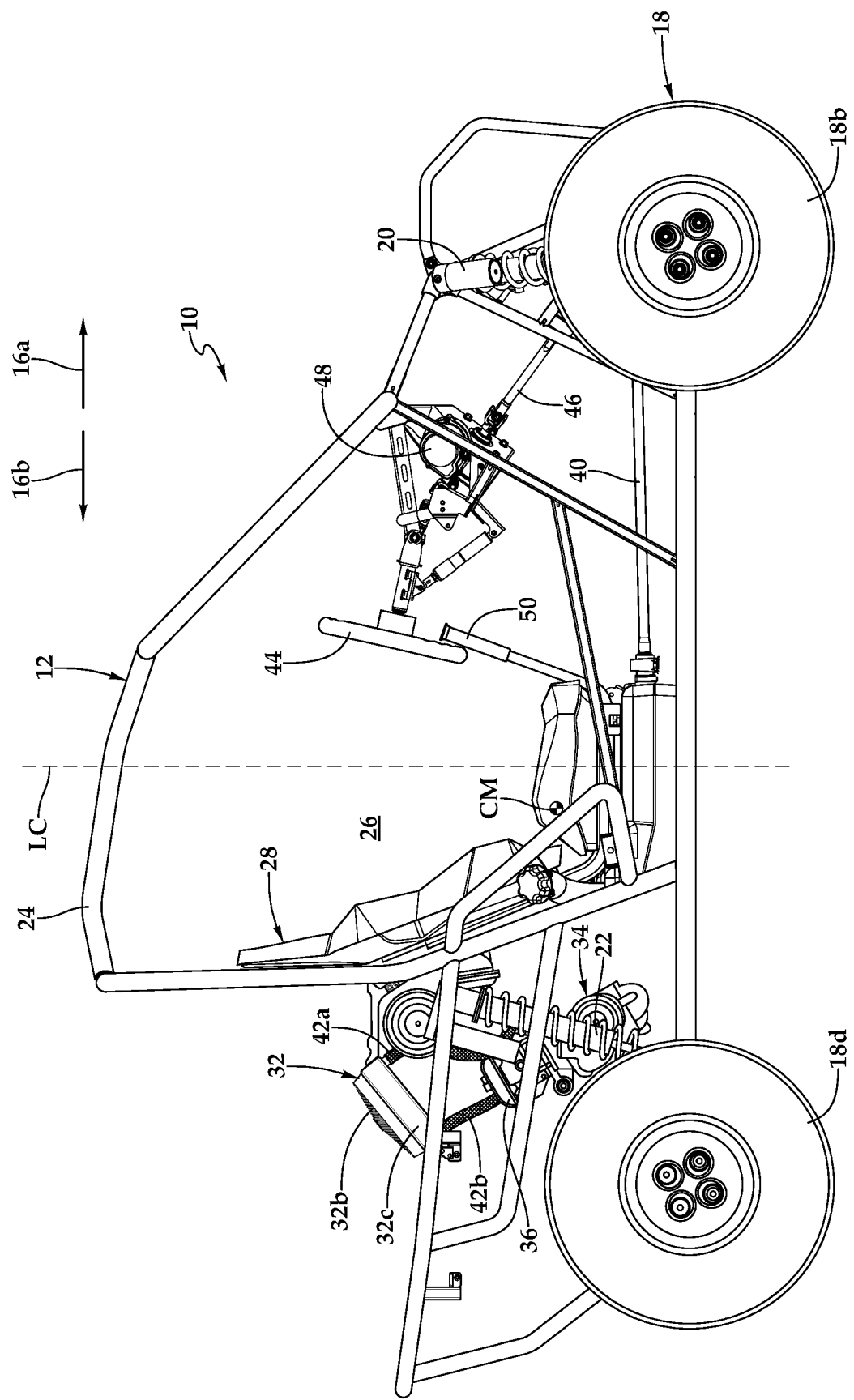

Frame assembly 12 includes a rollover protection structure 24 that at least partially defines an occupant space 26 within off-road vehicle 10, as best seen in FIG. 1D. In the illustrated embodiment, occupant space 26 includes a seating assembly 28 depicted as a pair of bucket seats; namely, a driver seat 28a and a passenger seat 28b in a side-by-side arrangement. In other embodiments, the seating assembly of an off-road vehicle may have a bench seating arrangement. In still other embodiments, the seating assembly of an off-road vehicle may have front and rear seats to accommodate additional occupants such as a total of four, five, six or more occupants. Positioned aft of seating assembly 28, off-road vehicle 10 includes a cargo box 30. Also positioned aft of seating assembly 28 and in a forward end of cargo box 30, off-road vehicle 10 includes a radiator 32 that is aftwardly pivotable from an operating configuration to an access configuration. In the operating configuration, radiator 32 has a forward tilted orientation in which a top of radiator 32 is positioned forward of a bottom of radiator 32. In the access configuration, radiator 32 has a substantially vertical orientation or an aftward tilted orientation in which the top of radiator 32 is positioned aftward of the bottom of radiator 32.

In FIG. 1D, body panels 14 have been removed from off-road vehicle 10 to better reveal certain additional components of off-road vehicle 10. For example, off-road vehicle 10 has a powertrain 34 that includes an engine 36 and a transmission 38 (see FIG. 1C), both of which are coupled to frame assembly 12. Engine 36 may be any type of engine such as a two-stroke engine, a four-stroke engine, an electric motor or other prime mover. Engine 36 may be naturally aspirated or may include a power adder such as a supercharger or a turbocharger. Transmission 38 may be a continuously variable transmission, an electrically variable transmission or other suitable transmission type for varying the ratio of the engine output speed to the input speed to wheels 18. In the illustrated embodiment, off-road vehicle 10 is a four-wheel drive vehicle in which powertrain 34 is operatively coupled to front wheels 18a, 18b via a front differential and to rear wheels 18c, 18d via a rear differential which is coupled to the front differential via a drive shaft 40. In other embodiments, off-road vehicle 10 may be a two-wheel drive vehicle such as a rear-wheel drive vehicle in which the powertrain is coupled to only the rear wheels or a front-wheel drive vehicle in which the powertrain is coupled to only the front wheels. Off-road vehicle 10 may have an equal vehicle weight distribution between front wheels 18a, 18b and rear wheels 18c, 18d or may have an uneven vehicle weight distribution favoring front wheels 18a, 18b or rear wheels 18c, 18d. For example, it may be desirable to have a weight distribution of 40/60 front to rear, with approximately 40 percent of the vehicle weight bearing on the front wheels 18a, 18b and 60 percent of the vehicle weight bearing on the rear wheels 18c, 18d. Other suitable front to rear weight distributions may be in the range between 35/65 and 45/55.

In the illustrated embodiment, radiator 32 is coupled to engine 36 via coolant lines 42a, 42b such that radiator 32 may serve as part of the engine cooling system providing heat exchanger functionality to cool a circulating fluid that is sent through engine 36 to absorb heat, thereby preventing engine overheating. Instead of being placed in the typically radiator location at the forward end of an off-road vehicle, radiator 32 is positioned aft of seating assembly 28, in the forward end of cargo box 30 and above components of powertrain 34 including both engine 36 and transmission 38. In this location, radiator 32 is positioned aft of the longitudinal center LC of off-road vehicle 10 and aft of and above the center of mass CM of off-road vehicle 10, as best seen in FIG. 1D. Radiator 32 has a forced air system that includes cooling fans 32a, 32b that intake air from above and aftward of radiator 32 and direct the air through a radiator body 32c that houses tubing with fins that efficiently allow the flowing air to extract heat from the fluid circulating through radiator 32. Positioning radiator 32 aft of seating assembly 28 and in the forward end of cargo box 30 helps to bias the center of mass CM of off-road vehicle 10 aftwardly, which may be desired for off-road vehicles. In current off-road vehicles having such aftward mounted radiators, it has been found that access to vehicle components located below the aftward mounted radiator requires removal of the radiator. In addition, it has been found, that cleaning the front side of such an aftward mounted radiator also requires removal of the radiator. The present embodiments, however, overcome these drawbacks due to the ability of radiator 32 to pivot aftwardly from the forward tilted operating configuration to the access configuration wherein radiator 32 has a substantially vertical orientation or an aftward tilted orientation that allows access to underlying components located below radiator 32 such as engine components including the air filter and also allows cleaning of the front side radiator 32 without the requirement of removing radiator 32.

Positioned within occupant space 26, off-road vehicle 10 includes a steering wheel 44 that is coupled to front wheels 18a, 18b via a steering linkage 46. In the illustrated embodiment, off-road vehicle 10 includes an electric power steering system 48 that is coupled to steering linkage 46. In other embodiments, off-road vehicle 10 may have hydraulically assisted power steering, electric power steering without a mechanical linkage such as a drive-by-wire system, electric assisted power steering or other suitable steering system. Also disposed within occupant space 26, off-road vehicle 10 includes a gear shift selector 50 that is coupled to transmission 38 and enables the driver to shift off-road vehicle 10 between various diving modes including forward and reverse driving modes.

Figure 2A:
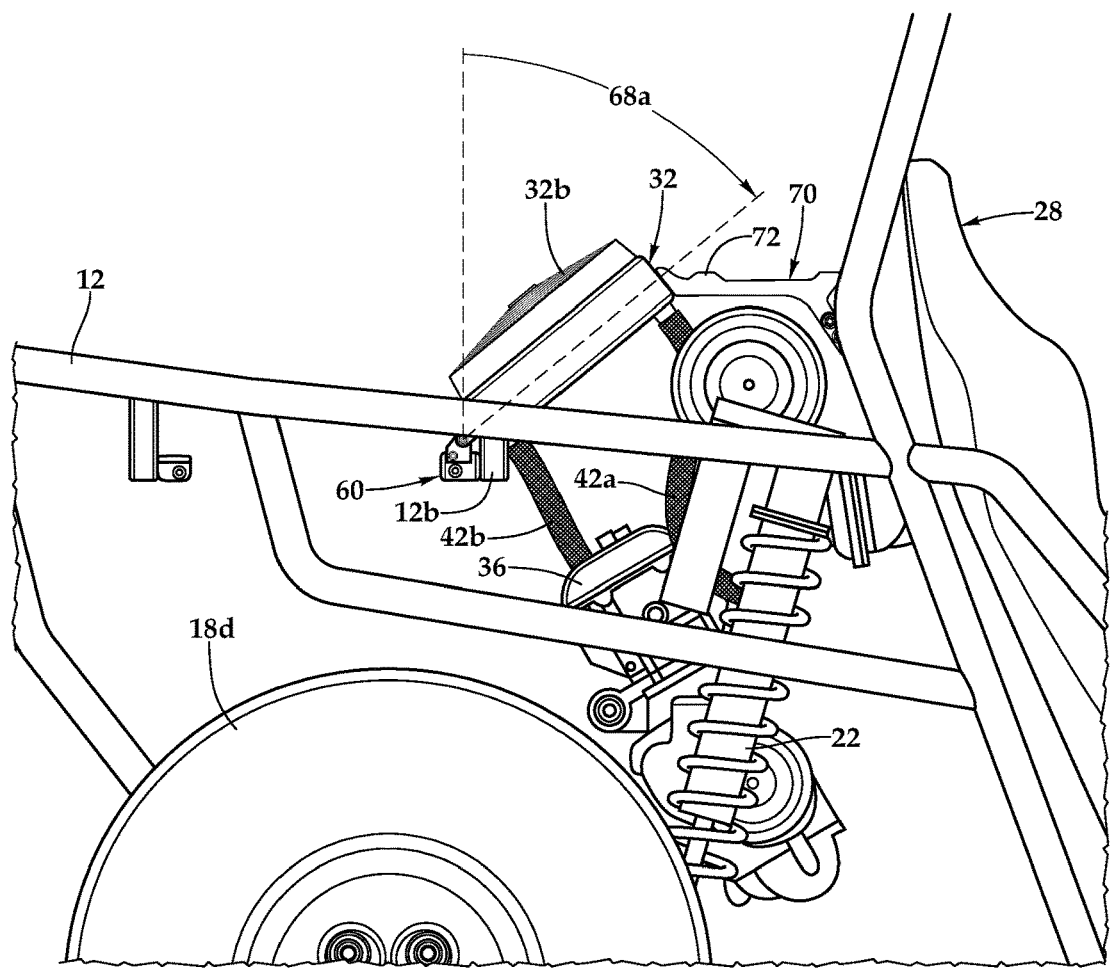
FIGS. 2A-2C are schematic illustrations of an aftwardly pivotable radiator for an off-road vehicle in accordance with embodiments of the present disclosure in various positions.
Figure 3A:
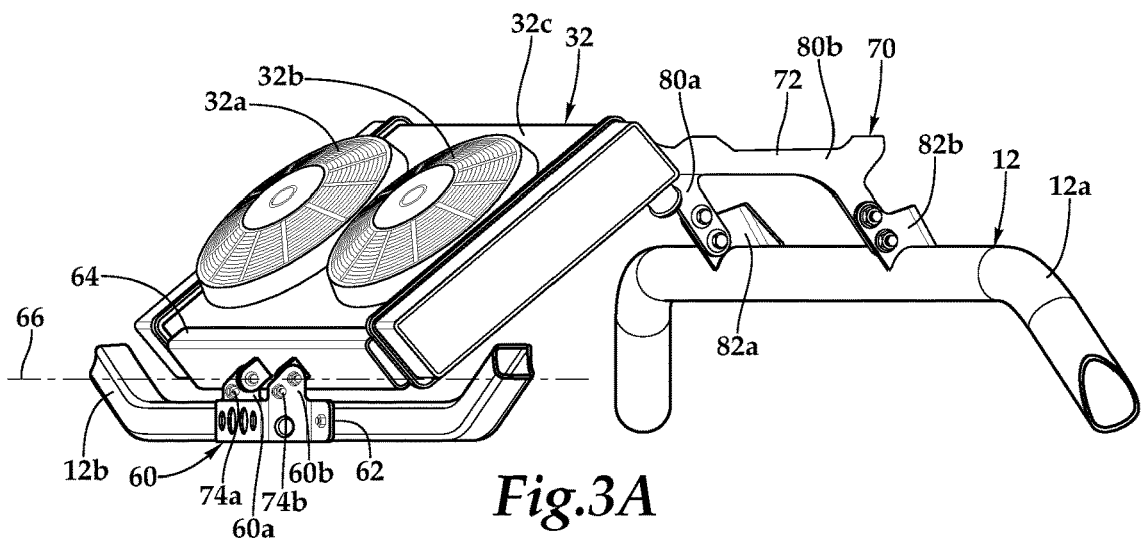
FIGS. 3A-3C are schematic illustrations of an aftwardly pivotable radiator for an off-road vehicle in accordance with embodiments of the present disclosure in various positions.
Figure 2B:
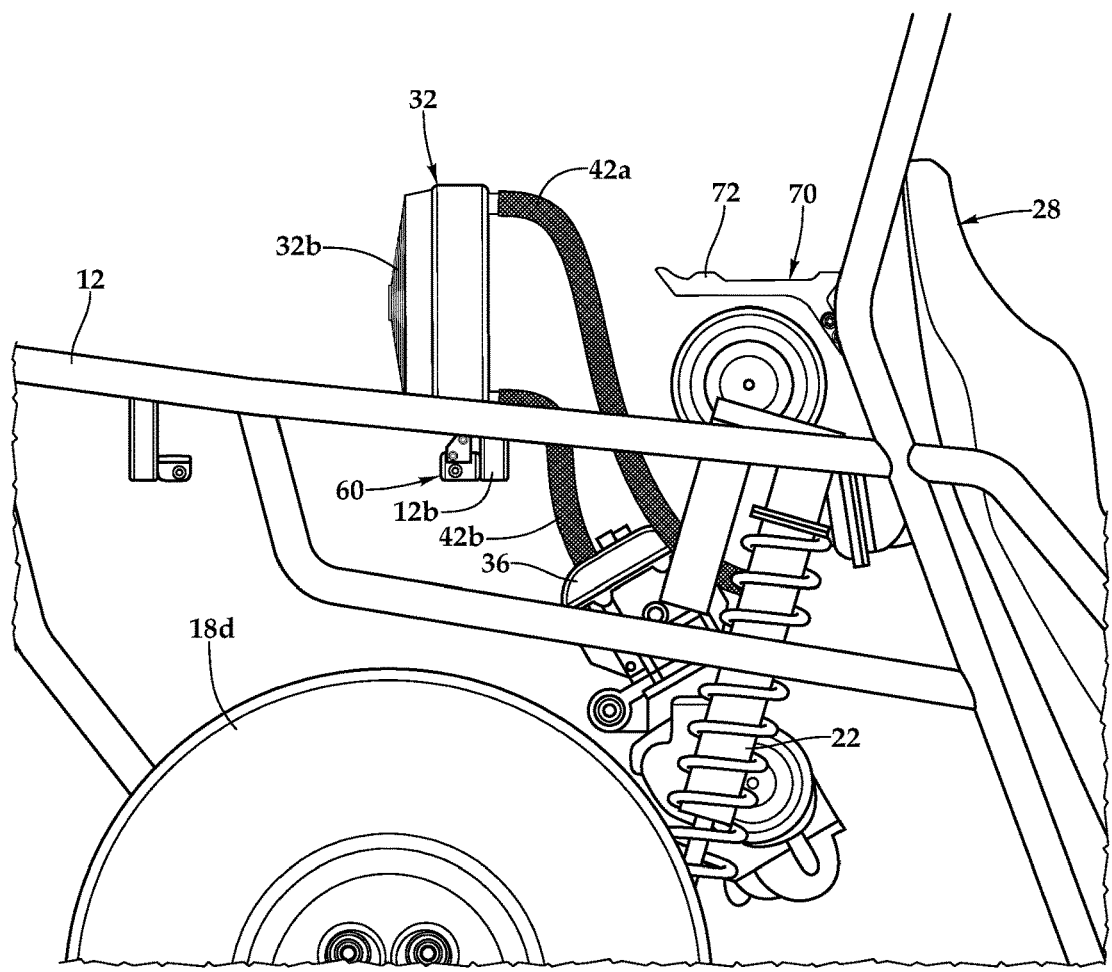
Figure 3B:
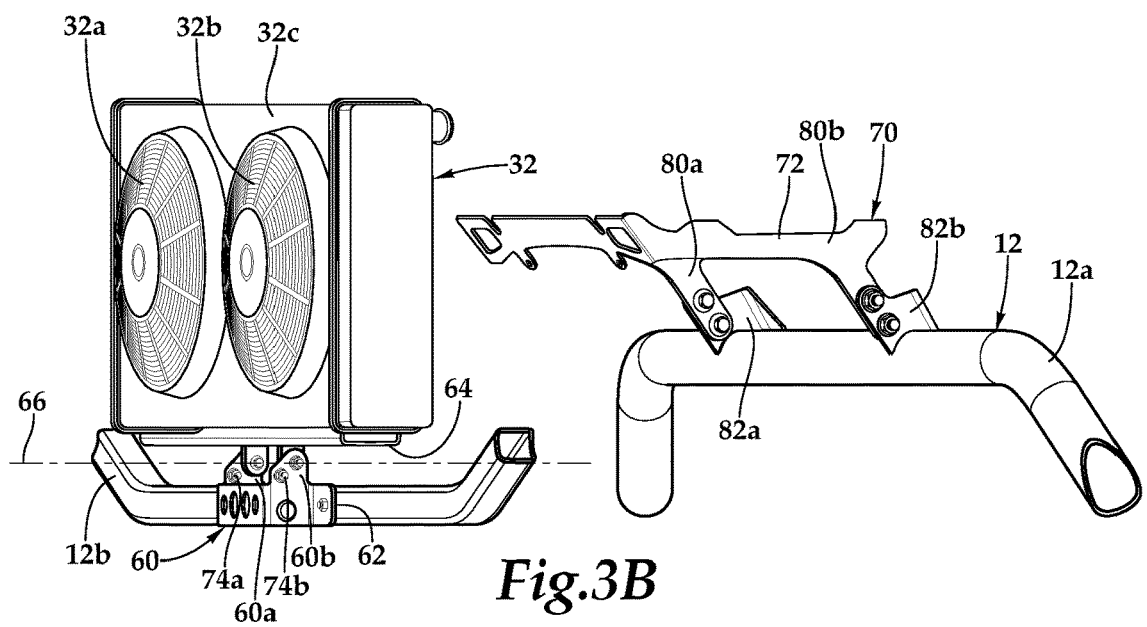
Figure 2C:
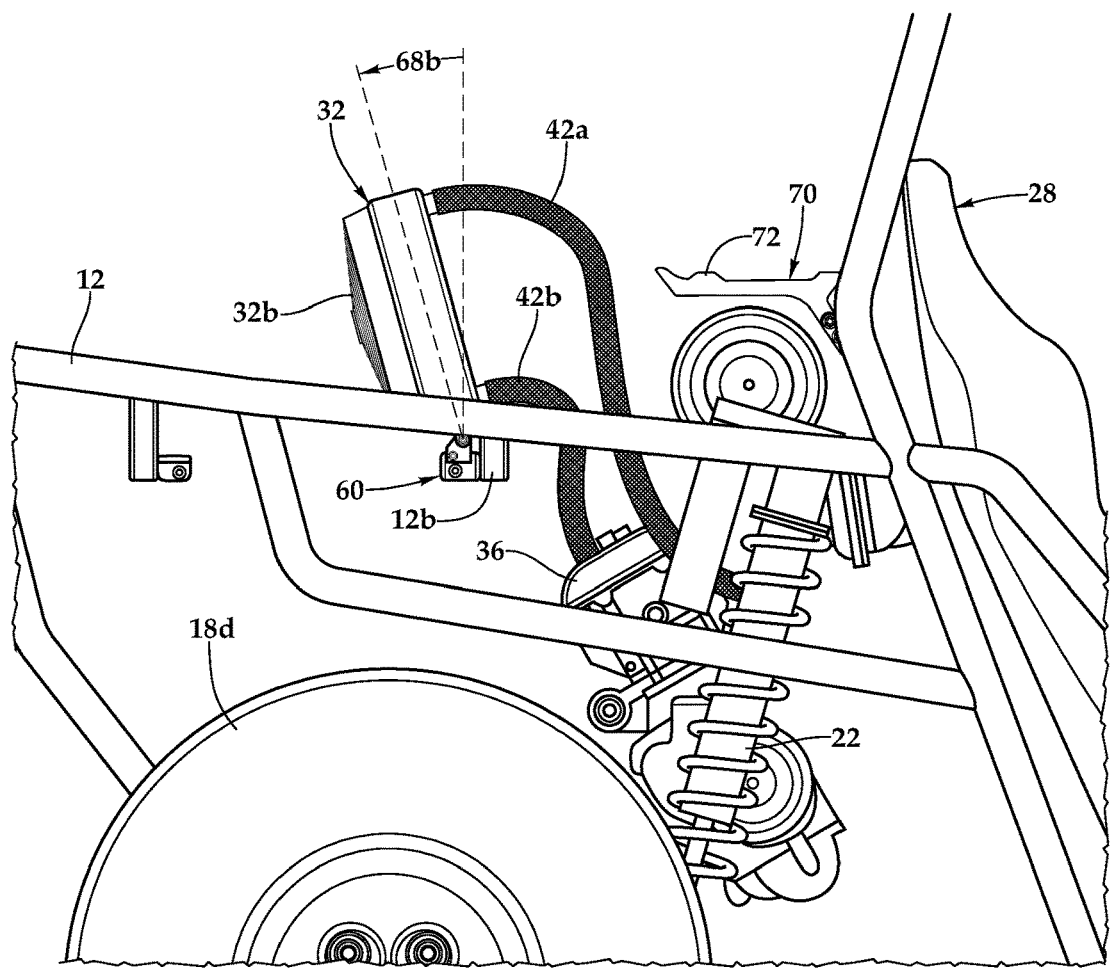
Figure 3C:
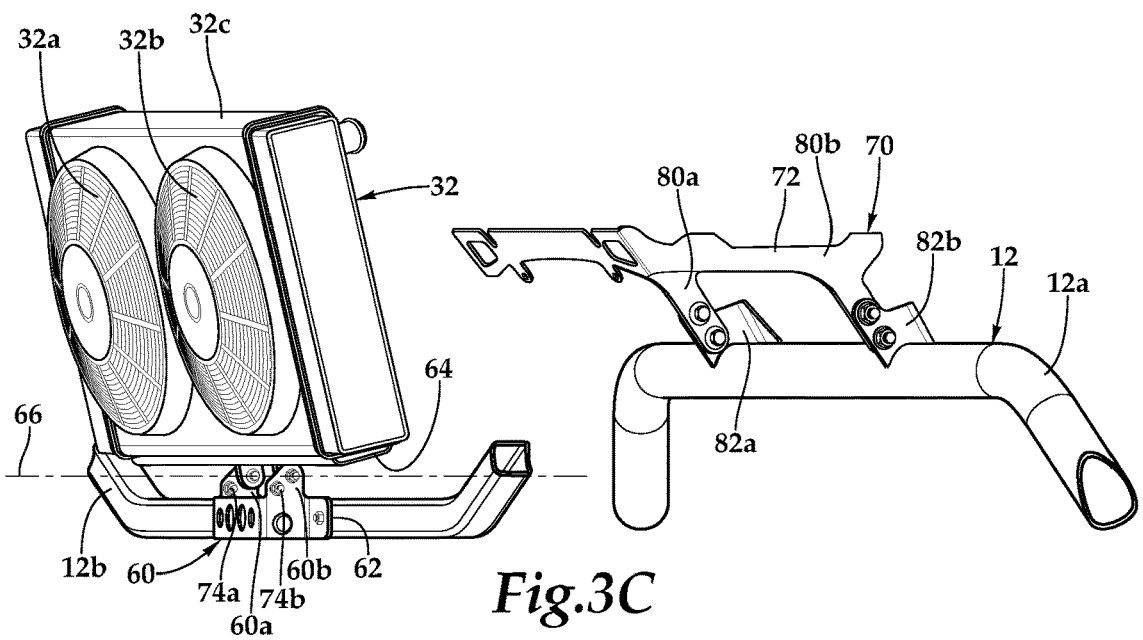
Figure 4A:
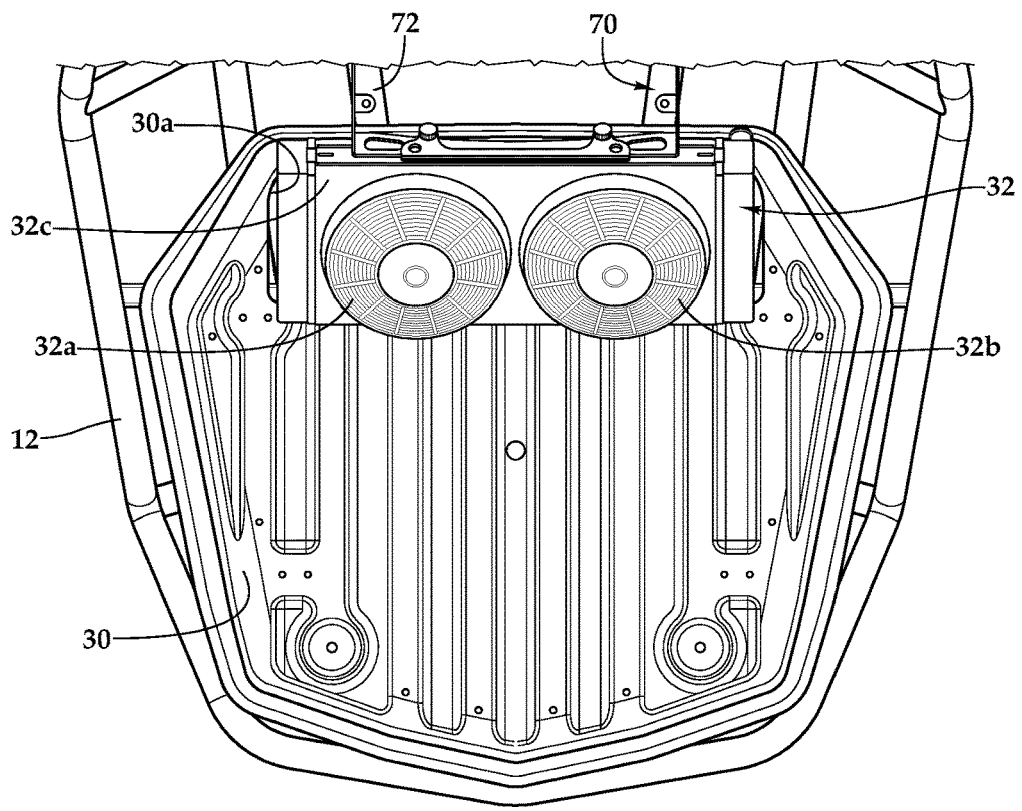
FIGS. 4A-4C are schematic illustrations of an aftwardly pivotable radiator for an off-road vehicle in accordance with embodiments of the present disclosure in various positions.
Figure 5A:
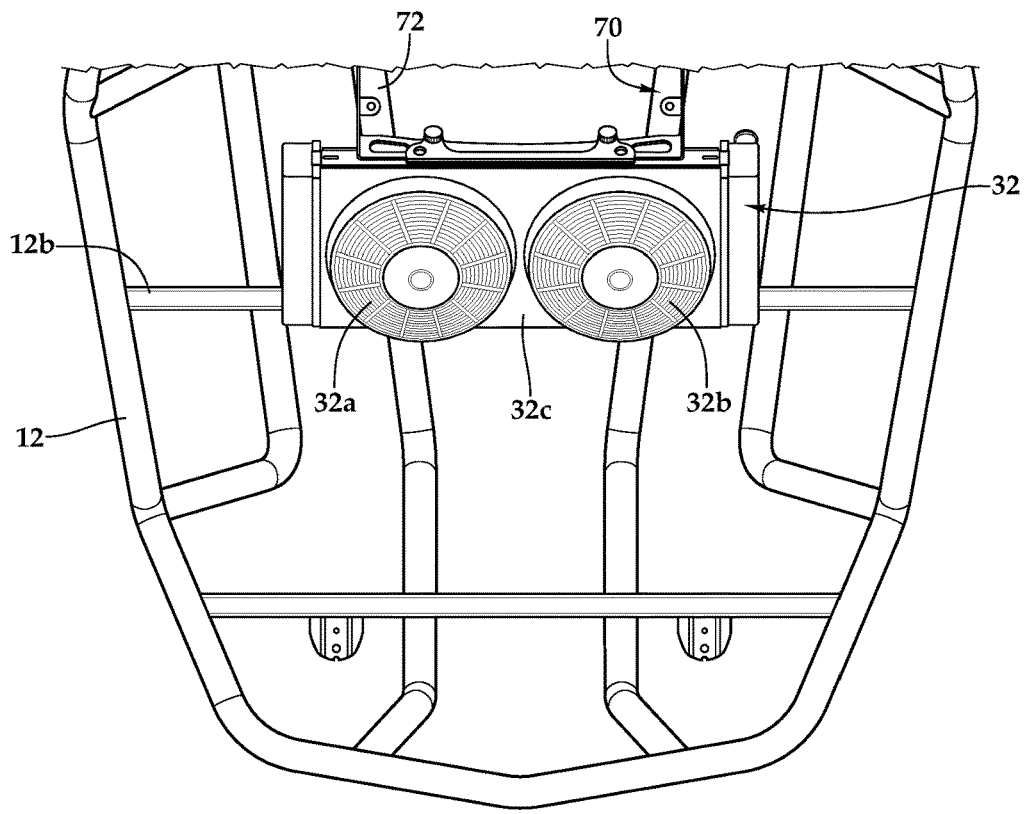
FIGS. 5A-5C are schematic illustrations of an aftwardly pivotable radiator for an off-road vehicle in accordance with embodiments of the present disclosure in various positions.
Figure 4B:
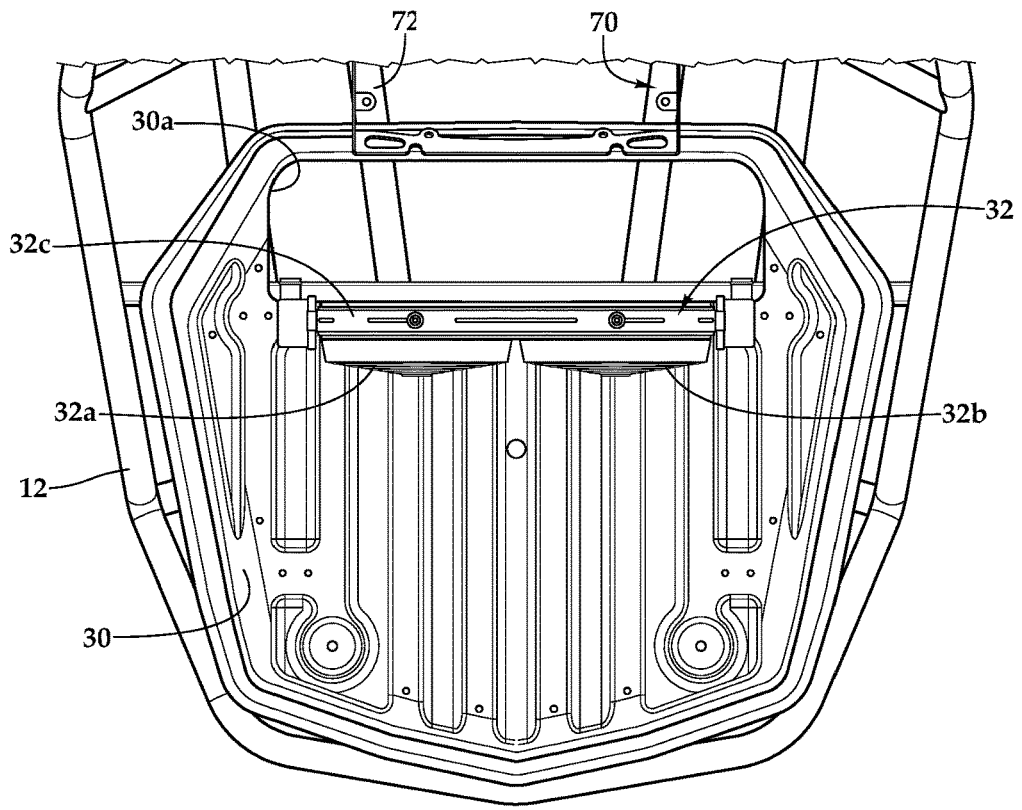
Figure 5B:
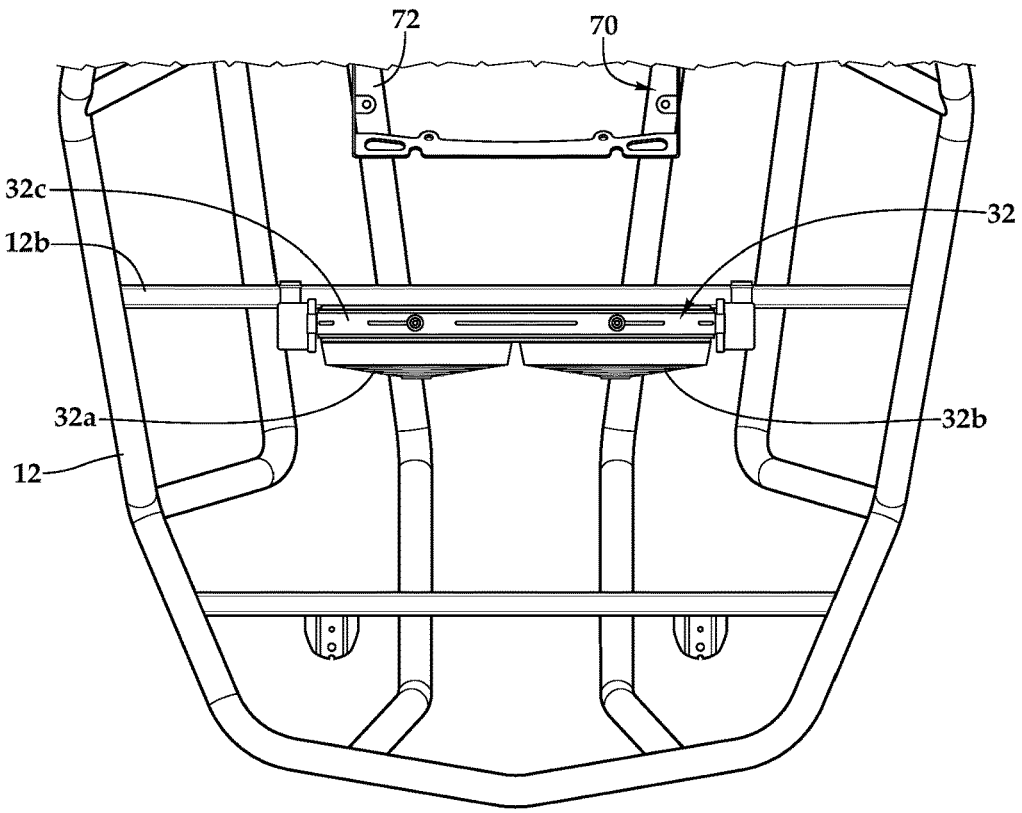
Figure 4C:
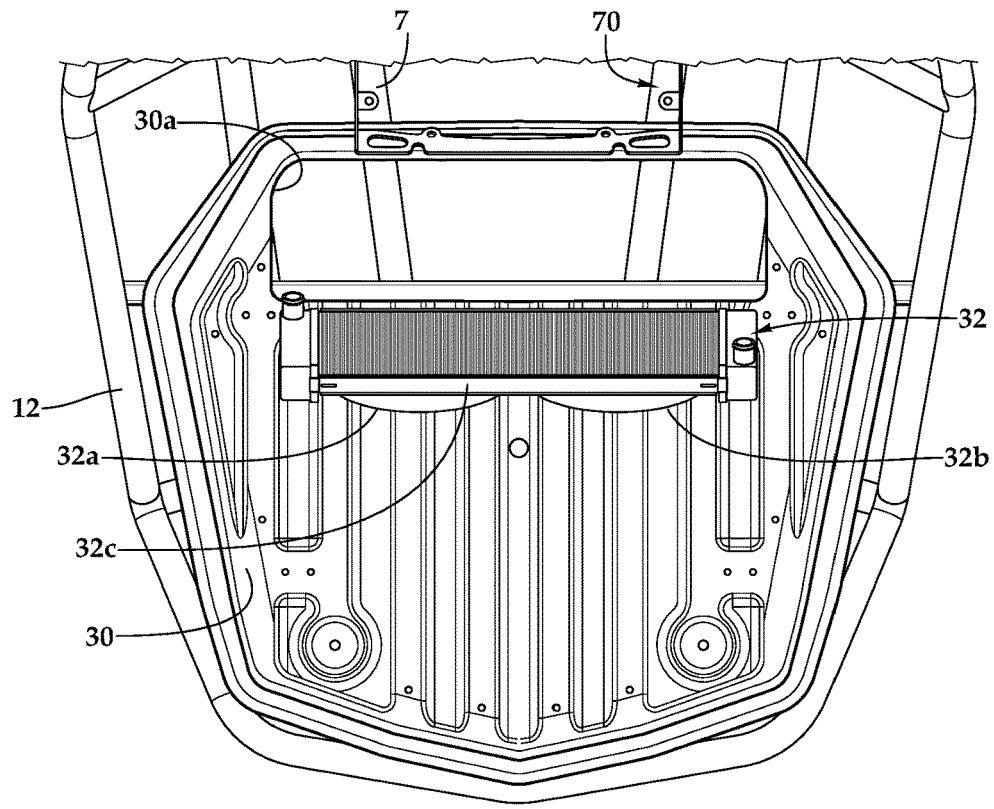
Figure 5C:
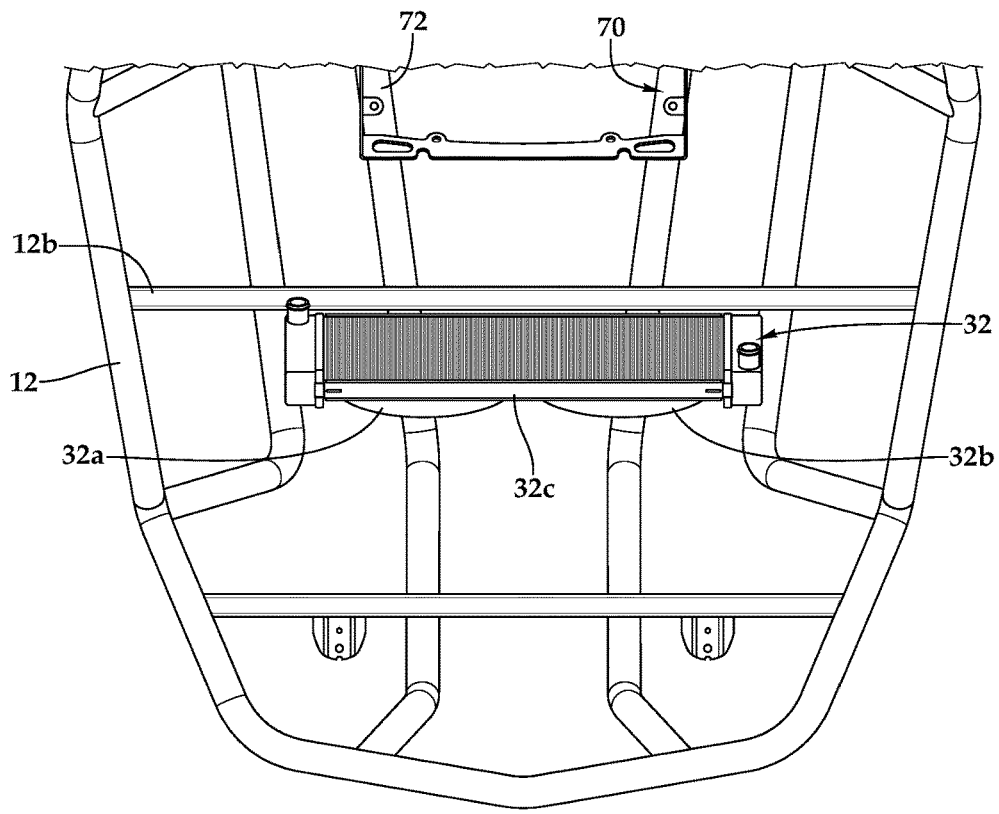

Referring additionally to FIGS. 2A-2C in the drawings, an embodiment of aftwardly pivotable radiator 32 for an off-road vehicle will be discussed in greater detail. Radiator 32 is coupled to and supported by frame 12 of off-road vehicle 10. More specifically, radiator 32 is supported by laterally extending frame cross members 12a, 12b, as best seen in FIG. 3A-3C. Radiator 32 is fluidically coupled to engine 36 via an inlet coolant line 42a that receives hot fluid from engine 36 and an outlet coolant line 42b that returns cooled fluid to engine 36 such that the circulation of cooling fluid between engine 36 and radiator 32 prevents engine overheating during the operation of off-road vehicle 10. As should be understood by those having ordinary skill in the art, that the cooling system of off-road vehicle 10 may include addition components such as a thermostat, a fluid pump and an overflow tank. Preferably, coolant lines 42a, 42b are flexible coolant lines that allow for the pivoting of radiator 32. Radiator 32 is coupled to frame cross member 12b by a hinge assembly 60. In the illustrated embodiment, hinge assembly 60 includes a bracket 62 that is coupled to frame cross member 12b by welds, bolts and/or other suitable fasteners. Hinge assembly 60 also includes a radiator support panel 64 that is coupled to the bottom of radiator 32 by welds, bolts and/or other suitable fasteners. Bracket 62 includes a pair of upwardly extending tabs each having a pair of openings therethrough. Likewise, radiator support panel 64 includes a pair of tabs each having an opening therethrough. The openings of the tabs of radiator support panel 64 are alignable with the forward openings of the tabs of bracket 62 such that bolts can pass through the aligned openings to pivotable support radiator support panel 64 relative to bracket 62 and thus radiator 32 relative to frame cross member 12b. Collectively, the aligned openings and bolts define a laterally extending axis of rotation 66 for radiator 32 that is located proximate the bottom of radiator 32. As hinge assembly 60 includes two bolts, each of which passes through a pair of aligned openings, hinge assembly 60 is considered to include two hinge members 60a, 60b. In other embodiments, a single pin could extend through all the aligned openings to form axis of rotation 66. In still other embodiments, an alternate hinge system could pivotably couple radiator 32 to frame cross member 12b.

As best seen in FIGS. 2A, 3A, 4A and 5A, radiator 32 is in the operating configuration in which radiator 32 has a forward tilted orientation with the top of radiator 32 positioned forward of the bottom of radiator 32. This orientation of radiator 32 is referred to herein as the operation configuration as this is the fixed orientation of radiator 32 during all operating modes of off-road vehicle 10. In this configuration, radiator 32 is coupled to frame cross member 12a by a lock assembly 70. In the illustrated embodiment, lock assembly 70 includes a bracket assembly 72 that is coupled to frame cross member 12a by welds, bolts and/or other suitable fasteners. Lock assembly 70 also includes a pair of projections that are coupled to and extend outwardly from the top of radiator 32. These projections are receivable by bracket assembly 72 such that radiator 32 is secured in the operating configuration to frame cross member 12a. In the illustrated embodiment, the forward tilted orientation of radiator 32 may preferably have an angle between thirty degrees and sixty degrees from vertical as indicated by the forward tilt angle 68a, as best seen in FIG. 2A. For example, the forward tilted orientation of radiator 32 may have an angle between forty degrees and fifty degrees from vertical such as an angle of about forty-five degrees from vertical.

As best seen in FIGS. 2B, 3B, 4B and 5B, radiator 32 is in a first access configuration in which radiator 32 has been aftwardly pivoted about lateral axis 66 from the operating configuration and has a substantially vertical orientation with the top of radiator 32 positioned directly above the bottom of radiator 32. This orientation of radiator 32 is referred to herein as an access configuration as radiator 32 is positioned to provide access to components of off-road vehicle 10 that are located below radiator 32, such as components of engine 36, via an opening 30a of cargo box 30. As should be understood by those having ordinary skill in the art, radiator 32 should only be aftwardly pivoted into the access configuration when off-road vehicle 10 is not operating. In this configuration, radiator 32 is decoupled to frame cross member 12a at lock assembly 70. The aftward rotation of radiator 32 may be limited to the substantially vertical orientation by stops 74a, 74b positioned in aftward openings of bracket 62. Alternatively, stops 74a, 74b may be omitted or stops 74a, 74b may be positioned such that radiator 32 has a second access configuration in which radiator 32 has an aftward tilted orientation, as best seen in FIGS. 2C, 3C, 4C and 5C. In the aftward tilted orientation of radiator 32, the top of radiator 32 is positioned aft of the bottom of radiator 32. In the illustrated embodiment, the aftward tilted orientation of radiator 32 may preferably have an angle between zero degrees and forty degrees from vertical as indicated by the aftward tilt angle 68b, as best seen in FIG. 2C. For example, the aftward tilted orientation of radiator 32 may have an angle between ten degrees and thirty degrees from vertical such as an angle of about twenty degrees from vertical.

Figure 6A:
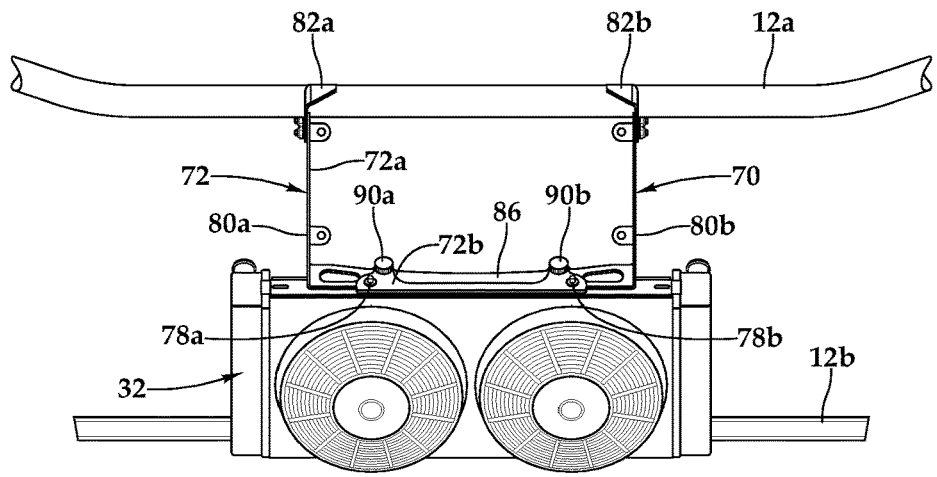
FIGS. 6A-6C are sequential diagrams depicting the process for pivoting an aftwardly pivotable radiator for an off-road vehicle in accordance with embodiments of the present disclosure in various positions.
Figure 6B:
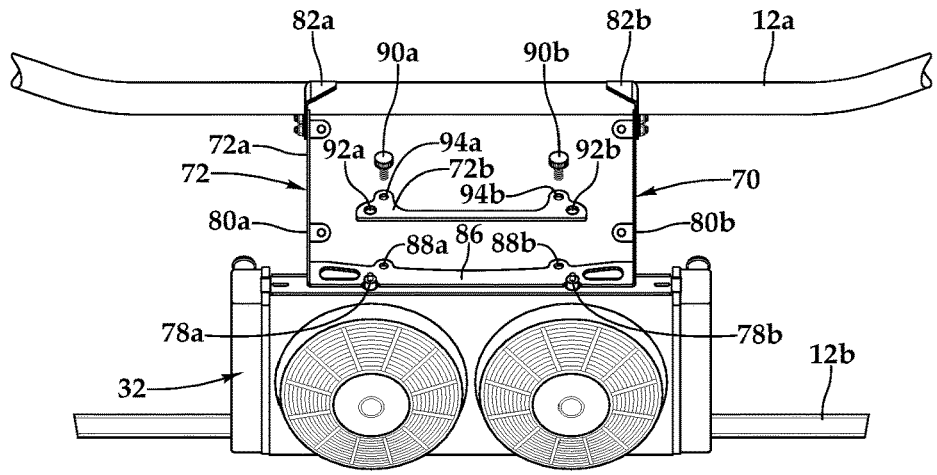
Figure 6C:
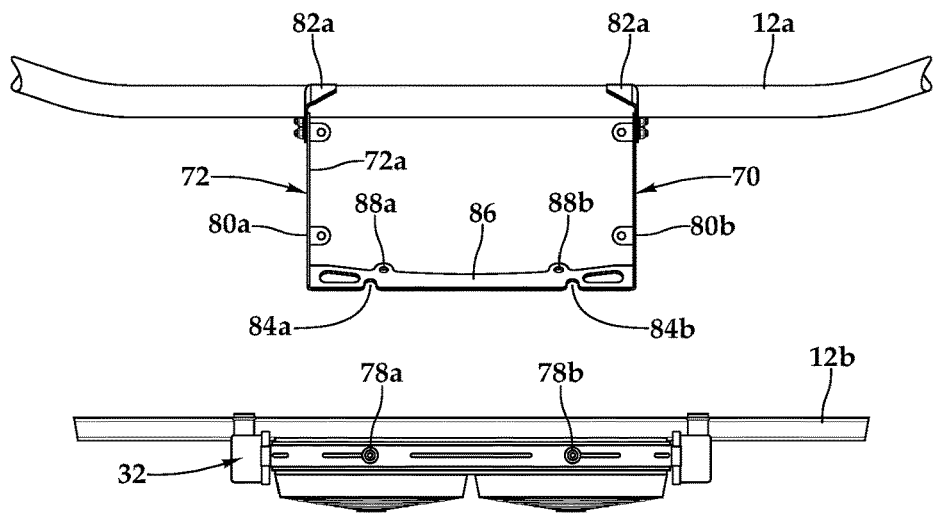

Referring now to FIGS. 6A-6C of the drawings, the process for securing and releasing radiator 32 from the operating configuration will now be discussed. In the illustrated embodiment, lock assembly 70 is formed by the cooperation of a support bracket 72a and a locking bracket 72b of bracket assembly 72 and projections 78a, 78b of radiator 32. Support bracket 72a is coupled to frame cross member 12a at a suitable connection depicted as a pair of extensions 80a, 80b bolted to mounting points 82a, 82b that are welded to frame cross member 12a, as best seen in FIG. 3A. Support bracket 72a includes a pair of slots 84a, 84b on an aftward facing portion of a cross member 86 that are sized and positioned to receive projections 78a, 78b therein. In addition, support bracket 72a includes a pair of threaded receivers 88a, 88b on a forward facing portion of cross member 86 that are sized and positioned to receive threaded fasteners 90a, 90b therein. Locking bracket 72b includes a pair of opening 92a, 92b on outboard portions thereof that are sized and positioned to receive projections 78a, 78b therein. In addition, locking bracket 72b includes a pair of threaded receivers 94a, 94 on a forward facing portion thereof that are sized and positioned to receive threaded fasteners 90a, 90b therein.

In FIG. 6A, radiator 32 is secured to frame cross member 12a by lock assembly 70 such that radiator 32 is fixed in the operating configuration. In this configuration, projection 78a is received within slot 84a of support bracket 72a and opening 92a of locking bracket 72b. Likewise, projection 78b is received within slot 84b of support bracket 72a and opening 92b of locking bracket 72b. In this configuration, locking bracket 72b is positioned on top of support bracket 72a such that threaded receiver 88a of support bracket 72a is aligned with threaded receiver 94a of locking bracket 72b and such that threaded receiver 88b of support bracket 72a is aligned with threaded receiver 94b of locking bracket 72b. Threaded fastener 90a is threadably coupled to threaded receiver 88a of support bracket 72a and threaded receiver 94a of locking bracket 72b. Likewise, threaded fastener 90b is threadably coupled to threaded receiver 88b of support bracket 72a and threaded receiver 94b of locking bracket 72b such that support bracket 72a is securably coupled to locking bracket 72b which fixes radiator 32 relative to frame cross member 12a in the operating configuration.

In FIG. 6B, the first step of aftwardly pivoting radiator 32 from the operating configuration to the access configuration is depicted. Threaded fastener 90a has been decoupled from threaded receiver 88a of support bracket 72a and threaded fastener 90b has been decoupled from threaded receiver 88b of support bracket 72a such that locking bracket 72b is no longer securably coupled to support bracket 72a. Locking bracket 72b may now be removed from its positioned on top of support bracket 72a which also dissociates projection 78a from opening 92a of locking bracket 72b and projection 78b from opening 92b of locking bracket 72b. In this configuration, radiator 32 is free to aftwardly pivot from the operating configuration to the access configuration, as best seen in FIG. 6C. In the access configuration, components under radiator 32 such as components of engine 36 are revealed and may be accessed for service, replacement or the like without removal of radiator 32. In addition, the access configuration allows for the forward side of radiator 32 to be cleaned without removal of radiator 32.

When it is time to return radiator 32 to the operating configuration, radiator 32 is forwardly pivoted until projection 78a is received within slot 84a of support bracket 72a and projection 78b is received within slot 84b of support bracket 72a. Locking bracket 72b may now be lowered onto support bracket 72a such that projection 78a is received within opening 92a of locking bracket 72b and projection 78b is received within opening 92b of locking bracket 72b which also aligns threaded receiver 88a of support bracket 72a with threaded receiver 94a of locking bracket 72b and threaded receiver 88b of support bracket 72a with threaded receiver 94b of locking bracket 72b. Threaded fastener 90a is now threadably coupled to threaded receiver 88a of support bracket 72a and threaded receiver 94a of locking bracket 72b and threaded fastener 90b is threadably coupled to threaded receiver 88b of support bracket 72a and threaded receiver 94b of locking bracket 72b such that support bracket 72a is securably coupled to locking bracket 72b which again fixes radiator 32 relative to frame cross member 12a in the operating configuration.

Figure 7A:
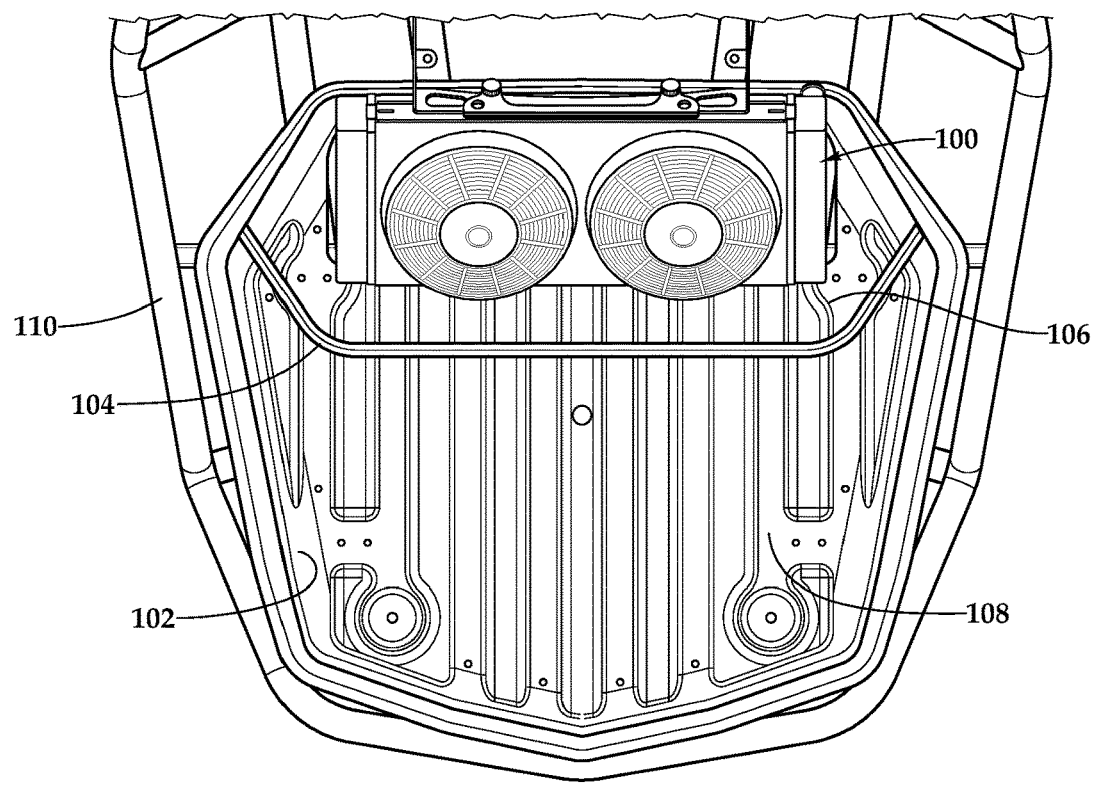
FIGS. 7A-7B are schematic illustrations of an aftwardly pivotable radiator for an off-road vehicle in accordance with embodiments of the present disclosure in various positions.
Figure 7B:
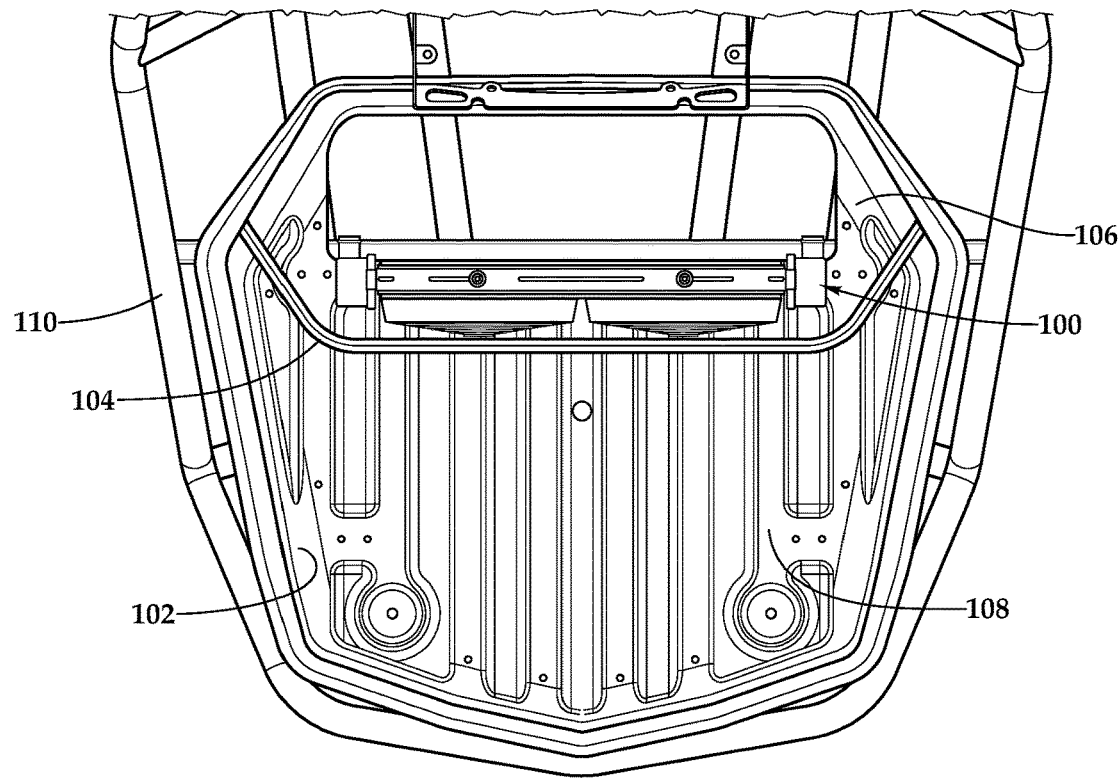

Referring now to FIGS. 7A-7B of the drawings, therein is depicted an aftwardly pivotable radiator for an off-road vehicle in accordance with embodiments of the present disclosure in the operating configuration and the access configuration, respectively. Radiator 100 is substantially similar to radiator 32 described herein with regard to cooling system functionally and aftwardly tilting functionality. In addition, similar to radiator 32, radiator 100 is positioned aft of the seating assembly, in the forward end of cargo box 102 and above components of the powertrain including both the engine and the transmission of the off-road vehicle. In the illustrated embodiment, however, radiator 100 is positioned forward of a protective shroud 104 that divides cargo box 102 into a radiator area 106 and a separate storage area 108. Protective shroud 104 may be formed integrally with cargo box 102 or may be installed within and coupled to cargo box 102 and/or frame 110. This embodiment of cargo box 102 having shroud 104 positioned therein tends to protect radiator 100 for being contacted by any cargo that is not secured within cargo box 102 during operations of the off-road vehicle.

The disclosed embodiments of the aftwardly pivoting radiator for an off-road vehicle discussed herein teach a radiator for an off-road vehicle that has a fixed operating configuration having a forward tilted orientation. In addition, the disclosed embodiments teach a radiator for an off-road vehicle that pivots from the forward tilted orientation toward a vertical orientation and/or past a vertical orientation to an aftward tilted orientation. Further, the disclosed embodiments teach a radiator for an off-road vehicle that pivots about a fixed axis located below the radiator. Also, the disclosed embodiments teach a radiator for an off-road vehicle that is secured to the frame of the vehicle in the forward tilted orientation using a dual bracket locking system.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An off-road vehicle comprising:
a frame assembly;
a powertrain coupled to the frame assembly;
a plurality of wheels at least one of which is operatively coupled to the powertrain;
a seating assembly coupled to the frame assembly;
a cargo box coupled to the frame assembly aft of the seating assembly;
a radiator hingedly coupled to the frame assembly aft of the seating assembly and configured to pivot aftward from an operating configuration to an access configuration; and
a lock assembly including a first bracket coupled to the frame assembly and a pair of projections coupled to the top of the radiator, the first bracket having a pair of slots;
wherein, in the operating configuration, the radiator has a forward tilted orientation in which a top of the radiator is positioned forward of a bottom of the radiator;
wherein, in the access configuration, the radiator has a substantially vertical orientation or an aftward tilted orientation in which the top of the radiator is positioned aftward of the bottom of the radiator; and
wherein, each of the projections is received within a corresponding one of the slots when the radiator is in the operating configuration.

2. The off-road vehicle as recited in claim 1 wherein, the radiator is positioned at a forward end of the cargo box.

3. The off-road vehicle as recited in claim 1 wherein, the powertrain includes an engine; and
wherein, the radiator is fluidically coupled to the engine such that heated fluid from the engine circulates through the radiator to be cooled.

4. The off-road vehicle as recited in claim 3 wherein, the radiator is positioned above the engine;
wherein, in the operating configuration, the engine is non-accessible from above; and
wherein, in the access configuration, the engine is accessible from above.

5. The off-road vehicle as recited in claim 1 further comprising a hinge assembly coupled between the frame assembly and the radiator.

6. The off-road vehicle as recited in claim 5 wherein, the hinge assembly further comprises at least first and second hinge members.

7. The off-road vehicle as recited in claim 5 wherein, the hinge assembly is coupled to the bottom of the radiator.

8. The off-road vehicle as recited in claim 5 wherein, the hinge assembly defines a laterally extending axis of rotation for the radiator located proximate the bottom of the radiator.

9. The off-road vehicle as recited in claim 1 wherein, the lock assembly selectively secures the radiator to the frame assembly in the operating configuration.

10. The off-road vehicle as recited in claim 9 wherein, the lock assembly selectively secures the top of the radiator to the frame assembly in the operating configuration.

11. The off-road vehicle as recited in claim 9 wherein, the lock assembly further comprises:
a second bracket having a pair of openings;

wherein each projection is received within a corresponding one of the openings when the second bracket is coupled to the first bracket to secure the radiator in the operating configuration.

12. The off-road vehicle as recited in claim 1 wherein, in the operating configuration, the forward tilted orientation of the radiator is between thirty degrees and sixty degrees from vertical.

13. The off-road vehicle as recited in claim 1 wherein, in the operating configuration, the forward tilted orientation of the radiator is between forty degrees and fifty degrees from vertical.

14. The off-road vehicle as recited in claim 1 wherein, in the operating configuration, the forward tilted orientation of the radiator is about forty-five degrees from vertical.

15. The off-road vehicle as recited in claim 1 wherein, in the access configuration, the aftward tilted orientation of the radiator is between zero degrees and forty degrees from vertical.

16. The off-road vehicle as recited in claim 1 wherein, in the access configuration, the aftward tilted orientation of the radiator is between ten degrees and thirty degrees from vertical.

17. The off-road vehicle as recited in claim 1 wherein, in the access configuration, the aftward tilted orientation of the radiator is about twenty degrees from vertical.

18. The off-road vehicle as recited in claim 1 further comprising a shroud positioned within the cargo box aft of the radiator, the shroud configured to separate a storage area of the cargo box from the radiator.

19. The off-road vehicle as recited in claim 1 wherein, the off-road vehicle is a side-by-side vehicle.

20. An off-road vehicle comprising:
a frame assembly;
a powertrain coupled to the frame assembly, the powertrain including an engine;
a plurality of wheels at least one of which is operatively coupled to the powertrain;
a seating assembly coupled to the frame assembly;
a cargo box coupled to the frame assembly aft of the seating assembly;
a radiator fluidically coupled to the engine such that heated fluid from the engine circulates through the radiator to be cooled,
the radiator positioned above the engine, aft of the seating assembly and at a forward end of the cargo box,
the radiator configured to pivot aftward from an operating configuration to an access configuration;
a hinge assembly coupled between the frame assembly and a bottom of the radiator, the hinge assembly defining a laterally extending axis of rotation about which the radiator pivots between the operating configuration and the access configuration; and
a lock assembly configured to selectively secure a top of the radiator to the frame assembly in the operating configuration; the lock assembly including a first bracket coupled to the frame assembly and a pair of projections coupled to the top of the radiator, the first bracket having a pair of slots;
wherein, in the operating configuration, the radiator has a forward tilted orientation in which the top of the radiator is positioned forward of the bottom of the radiator; and
wherein, in the access configuration, the radiator has a substantially vertical orientation or an aftward tilted orientation in which the top of the radiator is positioned aftward of the bottom of the radiator.

* * * * *